Figure 1:
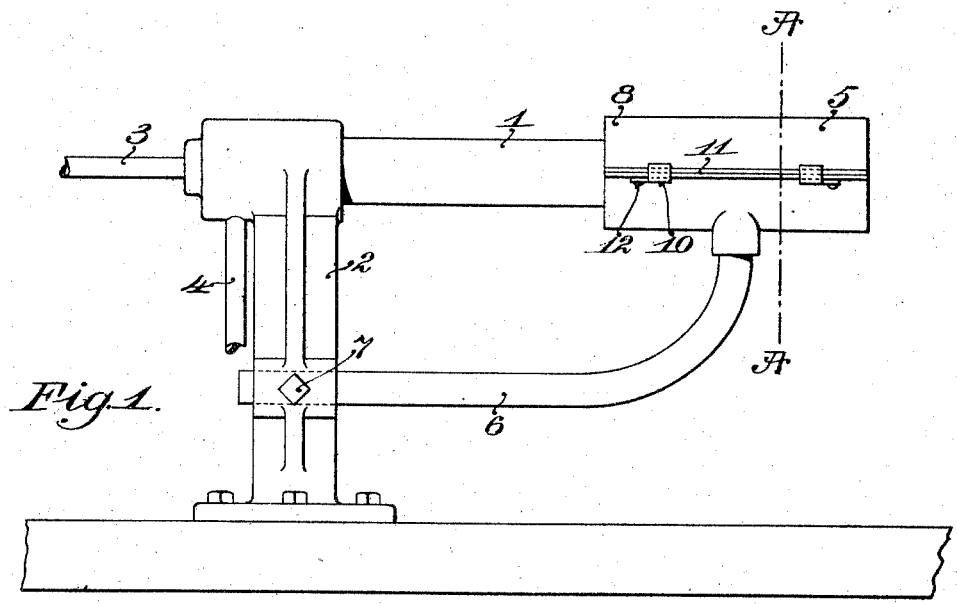

No. 764,524. PATENTED JULY 5, 1904.
S. B. DANE.
DEVICE FOR SHAPING AND DRYING COLLARS.
APPLICATION FILED OCT. 30, 1903.
NO MODEL.

Witnesses
Edward S. Day
Farnum F. Dorsey

Inventor
Sidney B. Dane
by his Attorneys
Phillips Van Everen & Fish

No. 764,524. Patented July 5, 1904.

UNITED STATES PATENT OFFICE.

SIDNEY B. DANE, OF LYNN, MASSACHUSETTS.

DEVICE FOR SHAPING AND DRYING COLLARS.

SPECIFICATION forming part of Letters Patent No. 764,524, dated July 5, 1904.

Application filed October 30, 1903. Serial No. 179,201. (No model.)

*To all whom it may concern:*

Be it known that I, SIDNEY B. DANE, a citizen of the United States, residing at Lynn, in the county of Essex and State of Massachusetts, have invented certain new and useful Improvements in Devices for Shaping and Drying Collars; and I do hereby declare the following to be a full, clear, and exact description of the invention, such as will enable others skilled in the art to which it appertains to make and use the same.

The present invention relates to an improvement in devices for shaping and drying collars.

In the laundering of turn-down collars the collars are first spread flat and ironed and are then doubled over and creased longitudinally. After the latter operation the collars are straight, and for the convenience of the user it is desirable to curve them longitudinally. It has been proposed to accomplish this by moistening the collars and wrapping them around a heated cylinder. In the use of such devices of this kind as have been heretofore used it has been necessary for the operator to hold the ends of the collar until the heating has continued sufficiently long so that only one collar could be operated on at a time.

The object of the present invention is to provide a device of the kind described with means for holding the collar during the operation; and to this end the invention consists in the improved device of which the preferred embodiment is herein described and shown in the drawings.

Figure 2:
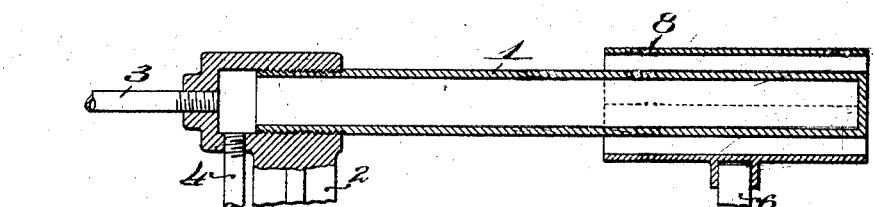
Figure 3:
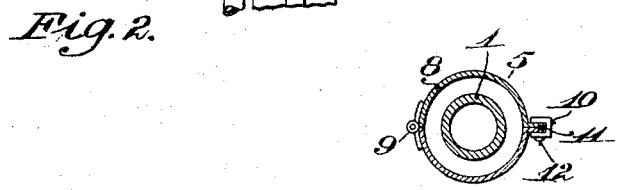

In the drawings, Figure 1 is a side elevation of the entire device. Fig. 2 is a vertical longitudinal section of the upper part of the same; and Fig. 3 is a section on line A A, Fig. 1, looking toward the right.

The preferred embodiment of the invention is constructed as follows: A heating-cylinder 1 is supported at one end by a standard 2, secured to a bench or any convenient point. The cylinder is heated by means comprising steam-pipes 3 and 4 for conducting steam to and from the interior of the cylinder. A sleeve 5, surrounding a part of the cylinder serves to hold the collars in contact with the same. The sleeve is supported by an extension 6 from the standard, fixed thereto by a set-screw 7. The sleeve, in order that convenient access may be had to the interior thereof, has a movable upper part 8, hinged at 9 and held closed by catches 10. The catches comprise clips embracing the flanges 11 on the parts of the sleeve and pivoted at 12 to the lower flange.

The manner of use of the above-described device consists in wrapping the collars about the uncovered part of the heating-cylinder and then sliding them along the cylinder and into the sleeve. The collar previously inserted is discharged from the end of the cylinder by the insertion of a fresh collar, and while the latter is being heated the operator may be wrapping another collar around the uncovered part of the cylinder. After the last collar has remained long enough in the sleeve its removal may be facilitated by swinging back the upper part of the sleeve.

Any convenient means may be used to heat the cylinder, and, except as defined in the claims, the invention is not limited to the precise construction shown, but may be embodied in other forms.

Having thus described my invention, I claim as new and desire to secure by Letters Patent of the United States—

1. A device for drying and shaping collars, having, in combination, a cylinder about which the collars are wrapped, means for heating the cylinder, a sleeve for holding the collars wrapped about the cylinder, and means for supporting the sleeve concentrically with respect to the cylinder, substantially as described.

2. A device for drying and shaping collars, having, in combination, a cylinder supported at one end, means for heating the cylinder, an open-ended sleeve surrounding the free end of the cylinder to hold the collars in place, and means for supporting the sleeve in said position, substantially as described.

3. A device for drying and shaping collars, having, in combination, a cylinder, means for heating the same, and a sleeve surrounding the cylinder for holding the collars in place, the sleeve having a part movable to afford access to the interior thereof, substantially as described.

In testimony whereof I affix my signature in presence of two witnesses.

SIDNEY B. DANE.

Witnesses:
FARNUM F. DORSEY,
ALFRED H. HILDRETH.